United States Patent

Sauner

[11] Patent Number: 5,975,498
[45] Date of Patent: Nov. 2, 1999

[54] SPARE TIRE LIFT/CARRIER UNIT WITH DUAL RETAINERS

[75] Inventor: Marvin H. Sauner, Vandalia, Ohio

[73] Assignee: Deuer Manufacturing Inc., Dayton, Ohio

[21] Appl. No.: 09/211,164

[22] Filed: Dec. 14, 1998

[51] Int. Cl.⁶ .................................................. B66D 1/00
[52] U.S. Cl. .................... 254/323; 414/463; 414/466; 224/42.23; 224/42.24
[58] Field of Search ............................ 254/199, 323, 254/372, 375, 380; 414/463, 466; 224/42.12, 42.23, 42.24

[56] References Cited

U.S. PATENT DOCUMENTS

| | | |
|---|---|---|
| 4,794,771 | 1/1989 | Princell ................................ 224/42.23 |
| 4,884,785 | 12/1989 | Denman et al. . |
| 4,969,630 | 11/1990 | Denman et al. . |
| 5,188,341 | 2/1993 | Greaves . |
| 5,290,014 | 3/1994 | Ferqison, Jr. . |
| 5,314,288 | 5/1994 | Schmidt ............................. 254/232 X |
| 5,638,710 | 6/1997 | Howard, Jr. et al. ............... 414/463 X |

*Primary Examiner*—Donald P. Walsh
*Assistant Examiner*—Emmanuel M. Marcelo
*Attorney, Agent, or Firm*—Jacox, Meckstroth & Jenkins

[57] ABSTRACT

A spare tire and wheel assembly for a motor vehicle are held in a stored position under the vehicle body by a compact tire lift unit or winch having a primary flexible cable extending to the center of a retaining bracket releasably attached to the wheel hub. A secondary or auxiliary cable has one end portion secured by a crimp connector to the winch cable spaced above the bracket and extends through a laterally offset hole within the bracket to receive a stop fitting spaced below the bracket. In the event the winch cable breaks adjacent the retaining bracket, the spare tire and wheel assembly drops slightly to an inclined position supported by the stop fitting where rattling of the tire against the vehicle body alerts the driver of the vehicle that the winch cable has broken.

11 Claims, 1 Drawing Sheet

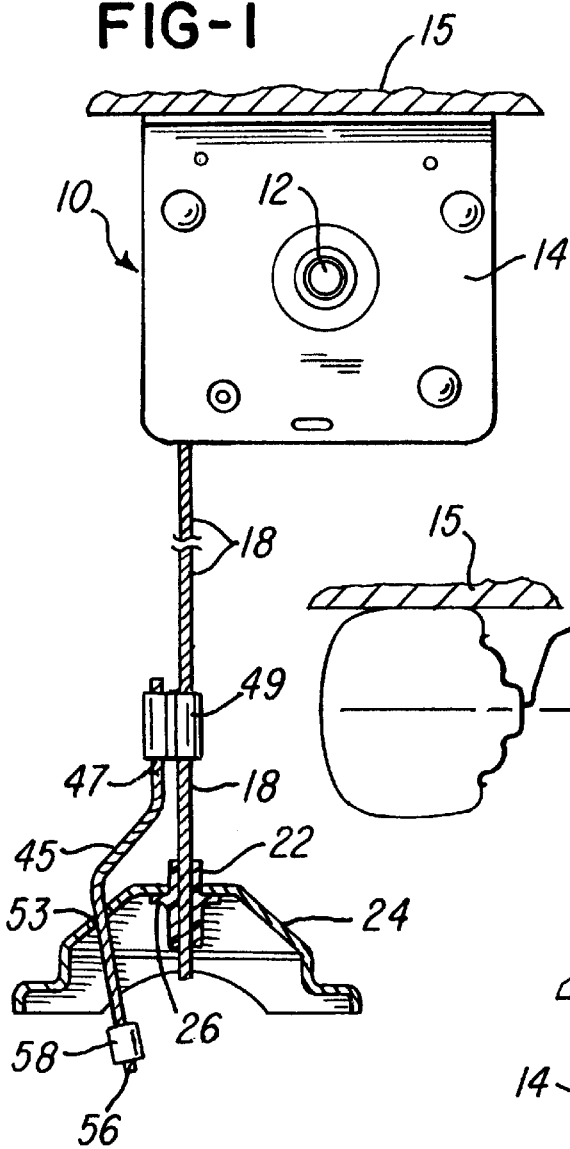
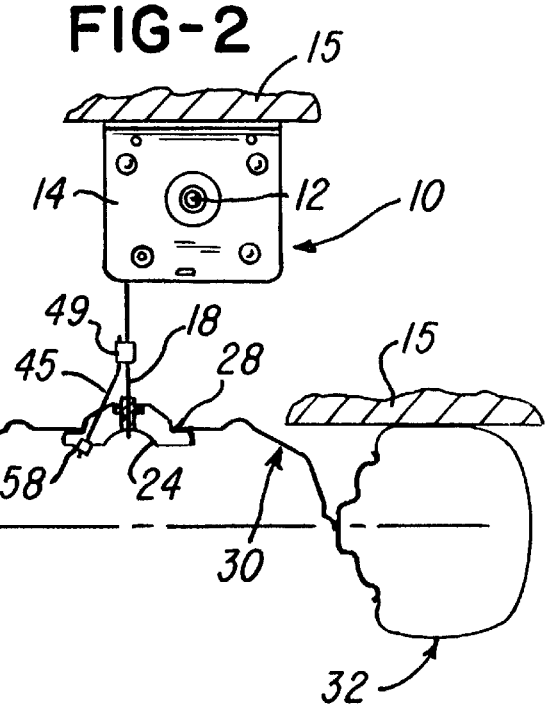
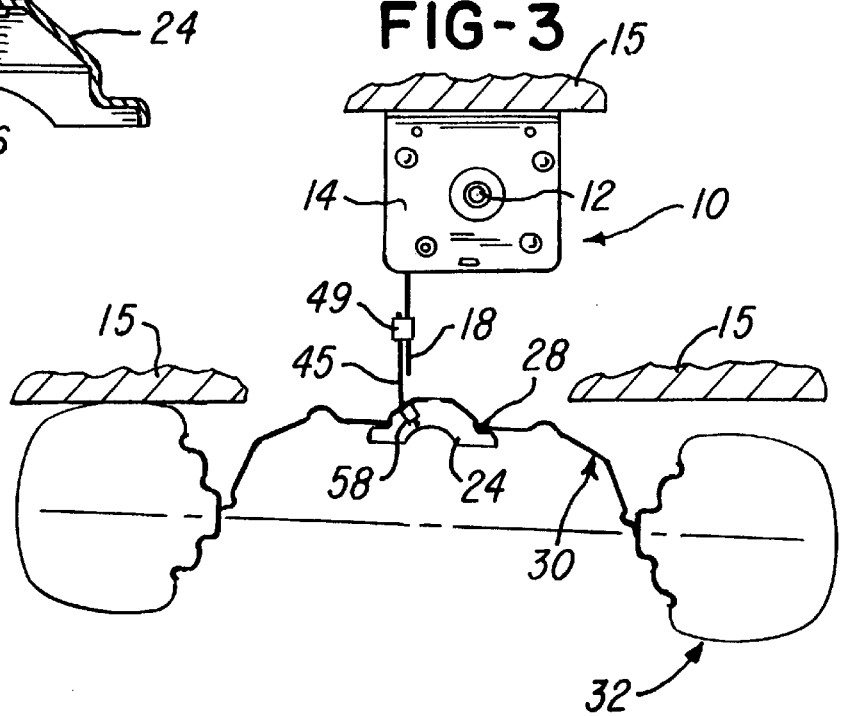

SPARE TIRE LIFT/CARRIER UNIT WITH DUAL RETAINERS

BACKGROUND OF THE INVENTION

This invention relates to a tire lift/carrier assembly or winch unit for raising and lowering and storing a spare tire and wheel assembly and of the general type disclosed in U.S. Pat. Nos. 4,969,630 and No. 5,290,014 which issued to the assignee of the present invention and the disclosures of which are herein incorporated by reference. In the installation and use of such a winch unit, it is sometimes desirable to provide an auxiliary support system which will support the spare tire and wheel assembly in an elevated position under a motor vehicle in the event the winch cable accidentally breaks after an extended period of time and resulting from the cable not being taut. Such a secondary support system is disclosed in U.S. Pat. No. 4,884,785 which issued to the assignee of the present invention and also in U.S. Pat. No. 5,188,341.

If a spare tire winch is not constructed to prevent any backup of the cable and loosening of the spare tire and wheel assembly the winch may not prevent lateral shifting of the tire due to vibration and movement of the vehicle. If the spare tire shifts or vibrates, it is possible that the cable extending from the winch to the spare tire retaining bracket will fray and sever or break adjacent the fitting connected to the tire retaining bracket. If this happens and there is no auxiliary support system as disclosed in the above '785 and '341 patents, the spare tire and wheel assembly are free to drop to the ground while the vehicle is moving on the road. In this event, not only may the spare tire and wheel assembly be lost, but the assembly may result in damage to a trailing vehicle or in causing an accident.

SUMMARY OF THE INVENTION

The present invention is directed to an improved tire winch assembly for raising and lowering a spare tire and wheel assembly from a lower access position resting on the pavement to an elevated stored position held tightly against the frame or body of the motor vehicle. According to a preferred embodiment of the invention, the improvement comprises an auxiliary or secondary cable having an upper end portion attached by a crimp connector to the supporting winch cable at a location spaced above the wheel hub retaining bracket. The secondary cable extends through a laterally offset hole within the tire retaining bracket, and a fitting is crimped to the lower end portion of the auxiliary cable at a location spaced below the retaining bracket. In the event the winch cable breaks adjacent the tire retaining bracket, the spare tire and wheel assembly drops down slightly to an incline position where the assembly is held by the auxiliary or secondary cable. In this inclined position, the spare tire and wheel assembly is free to bounce which produces a rattling sound or noise within the motor vehicle body to alert the driver that something is wrong with the spare tire lift/carrier unit and should be given immediate attention.

Other features and advantages of the invention will be apparent from the following description, the accompanying drawing and the appended claims.

BRIEF DESCRIPTION OF THE DRAWING

FIG. 1 is a side elevational view of a tire lift/carrier unit constructed in accordance with the invention and with a lower retaining bracket shown in section to illustrate the improvement incorporated in the unit;

FIG. 2 is a side elevational view of the tire lift/carrier unit shown in FIG. 1 and diagrammatically illustrating its position for retaining a spare tire and wheel assembly in its upper stored position; and FIG. 3 is a view similar to FIG. 2 and illustrating the position of the spare tire and wheel assembly in the event the winch cable breaks adjacent the retaining bracket.

Description Of The Preferred Embodiment

FIG. 1 illustrates a tire lift/carrier unit or winch assembly 10 which is constructed, for example, as disclosed in above-mentioned U.S. Pat. No. 5,290,014, but may have other constructions as shown in the prior patent art. The assembly 10 includes a center actuator shaft 12 rotatably supported by a housing including a set of side brackets 14 which are secured to a motor vehicle frame or body 15. The winch assembly has a flexible steel winch cable 18 which is extended and retracted in response to rotation of the shaft 12 in opposite directions. It is also within the scope of the invention to position the winch assembly or unit at a laterally offset position and to direct the cable 18 through a guide tube, for example, as disclosed in FIG. 1 of above-mentioned U.S. Pat. No. 4,969,630.

As further shown in FIG. 1, the lower end portion of the flexible steel cable 18 is secured to a tubular plastic fitting 22 which extends through a center hole within a formed sheet metal retaining bracket 24. The fitting 22 has a peripheral flange which supports the bracket 24, and the bracket 24 is rectangular in configuration so that it may be extended through a center hole 28 of a formed metal wheel 30 supporting a spare tire 32. As explained in the above-mentioned patents, operation of the winch assembly 10 by rotation of the shaft 12 is effective to raise and lower the assembly of the spare tire 32 and wheel 30 between a lower position resting on the ground or pavement and an upper or elevated stored position (FIG. 2) where the spare tire 32 is held firmly against the frame or body 15 of the motor vehicle.

Preferably, the winch assembly 10 is constructed as disclosed in above-mentioned U.S. Pat. No. 5,290,014 so that the internal drive mechanism within the housing incorporates an anti-backup feature whereby the cable 18 will not unwind slightly due to vibration of the vehicle and will always remain taut when the tire and wheel assembly is in the upper stored position shown on FIG. 2. However, if the winch assembly 10 is constructed without a positive anti-backup feature, it is possible for the winch cable to move slightly downwardly due to the load of the tire and wheel assembly and movement of the vehicle so that the assembly is not held firmly against the body 15 and is free to shift laterally or horizontally in response to movement of the vehicle. Such shifting over an extended period of time is known to cause the winch cable to break directly above the tire retaining bracket, as mentioned above.

In accordance with the present invention, a short length of auxiliary flexible steel cable 45 has an upper end portion 47 which is rigidly secured to the winch cable 18 by a clamp type or crimp cable connector 49. The connector 49 is rigidly secured to the winch cable 18 at a location spaced above the retaining bracket 24, and the cable 45 extends downwardly through a laterally offset hole 53 within the bracket 24. The cable 45 has a lower end portion 56 which receives a surrounding collar or stop fitting 58 also positively secured or crimped to the cable 45. The fitting 58 is spaced below the top of the bracket 24, as shown on FIG. 1.

Referring to FIG. 3, in the event the winch cable 18 breaks directly above or adjacent the retaining bracket 24 or fitting 22, the assembly of the wheel 30 and spare tire 32 will drop downwardly to an inclined position (FIG. 3) until the fitting 58 engages the underneath surface of the bracket 24 below the hole 53 to support the assembly. As a result of the lateral offset location of the hole 53, the center of gravity of the tire and wheel assembly is offset from the cable 45 and produces the inclined position shown in FIG. 3. In this position, one side of the wheel and tire assembly is free to bounce whereby the upper surface of the tire 32 impacts the frame or body 15 to cause a thumping or rattling noise. This noise is easily detected by the vehicle driver and alerts the driver that something is wrong with the spare tire lift/carrier unit or that the tire and wheel assembly has become loose. The driver may then have the winch assembly 10 inspected and replaced with a new winch unit.

As is apparent from the drawing and the above description, the auxiliary or secondary cable 45 and its secondary connection between the winch cable 18 and the retainer bracket 24, provide a simple and inexpensive safety means for preventing the spare tire and wheel assembly from dropping to the roadway or pavement in the event the winch cable 18 breaks adjacent the bracket 24 where the cable 18 has its greatest flexing when the spare tire 32 is not held firmly against the frame or body 15. While the auxiliary cable 45 is preferred, it is apparent that the cable may be replaced by a form of flexible chain or a rigid link member.

While the form of winch apparatus herein described constitutes a preferred embodiment of the invention, it is to be understood that the invention is not limited to this precise form of apparatus, and that changes may be made therein without departing from the scope and spirit of the invention as defined in the appended claims.

What is claimed is:

1. A spare tire lift unit comprising a winch having a flexible lift element which extends and retracts in response to rotation of a shaft, a retaining bracket mounted on a lower end portion of said flexible lift element and adapted to receive and support a spare tire and wheel assembly, an auxiliary support member having an upper end portion secured to said flexible lift element above said retaining bracket, and said auxiliary support member having a lower end portion supporting to said retaining bracket.

2. A tire lift unit as defined in claim 1 wherein said flexible lift element of said winch and said auxiliary support member each comprise a flexible steel cable.

3. A tire lift unit as defined in claim 1 wherein said auxiliary support member extends through a laterally offset hole within said retaining bracket to provide for tilting the spare tire and wheel assembly when the assembly is supported by said auxiliary support member.

4. A tire lift unit as defined in claim 1 wherein said upper end portion of said auxiliary support member is secured to said flexible lift element at a location spaced above said retaining bracket.

5. A tire lift unit as defined in claim 1 wherein said lower end portion of said auxiliary support member having a stop element space below said retaining bracket.

6. A spare tire lift unit comprising a winch having a flexible lift cable which extends and retracts in response to rotation of a shaft, a retaining bracket mounted on a lower end portion of said lift cable and adapted to receive and support a spare tire and wheel assembly, an auxiliary support cable having an upper end portion secured to said lift cable at a location spaced above said retaining bracket, and said auxiliary support cable having a lower end portion supporting said retaining bracket.

7. A tire lift unit as defined in claim 6 wherein said lift cable and said auxiliary support cable each comprise a flexible steel cable.

8. A tire lift unit as defined in claim 6 wherein said auxiliary support cable extends through a laterally offset hole within said retaining bracket to provide for tilting the spare tire and wheel assembly when the assembly is supported by said auxiliary support cable.

9. A tire lift unit as defined in claim 6 and including a crimp connector connecting said upper end portion of said auxiliary support cable to said lift cable at a location spaced above said retaining bracket.

10. A tire lift unit as defined in claim 6 wherein said lower end portion of said auxiliary support cable having a stop fitting space below said retaining bracket.

11. A spare tire lift unit comprising a winch having a flexible lift cable which extends and retracts in response to rotation of a shaft, a retaining bracket mounted on a lower end portion of said lift cable and adapted to receive and support a spare tire and wheel assembly, an auxiliary support cable having an upper end portion secured by a connector to said lift cable at a location spaced above said retaining bracket, said auxiliary support cable extending through a laterally offset hole within said retaining bracket, and a fitting secured to a lower end portion of said auxiliary support cable below said retaining bracket and being larger than said hole for supporting said retaining bracket and the tire and wheel assembly in an inclined position in the event said lift cable breaks.

* * * * *